(12) United States Patent
Kamibayashi et al.

(10) Patent No.: US 8,829,095 B2
(45) Date of Patent: Sep. 9, 2014

(54) CLEAR INK COMPOSITION

(75) Inventors: Masashi Kamibayashi, Matsumoto (JP);
Shuichi Koganehira, Matsumoto (JP);
Akira Mizutani, Matsumoto (JP);
Shinichi Yamamoto, Matsumoto (JP)

(73) Assignee: Seiko Epson Corporation (JP)

( * ) Notice: Subject to any disclaimer, the term of this patent is extended or adjusted under 35 U.S.C. 154(b) by 601 days.

(21) Appl. No.: 13/152,767

(22) Filed: Jun. 3, 2011

(65) Prior Publication Data

US 2011/0300298 A1 Dec. 8, 2011

(30) Foreign Application Priority Data

Jun. 3, 2010 (JP) .................. 2010-128206

(51) Int. Cl.
*C09D 11/10* (2014.01)
*C08K 5/05* (2006.01)
*B05D 5/00* (2006.01)
*C09D 11/00* (2014.01)

(52) U.S. Cl.
CPC ............. *C09D 11/54* (2013.01); *C09D 11/38* (2013.01)
USPC ........................................ 524/388; 427/256

(58) Field of Classification Search
CPC ............ C08L 23/00; C08K 5/05; C08K 5/053
USPC ......................................................... 524/388
See application file for complete search history.

(56) References Cited

U.S. PATENT DOCUMENTS

| | | | |
|---|---|---|---|
| 6,793,721 B2 | 9/2004 | Shen et al. | |
| 6,858,765 B2 | 2/2005 | Toyoda | |
| 7,060,740 B2 | 6/2006 | Kataoka et al. | |
| 7,332,023 B2 | 2/2008 | Rehman et al. | |
| 7,537,652 B2 | 5/2009 | Koganehira et al. | |
| 2003/0189626 A1 | 10/2003 | Kataoka et al. | |
| 2009/0176071 A1 | 7/2009 | Koganehira et al. | |
| 2009/0304927 A1* | 12/2009 | Kamibayashi et al. | ....... 427/258 |

FOREIGN PATENT DOCUMENTS

| | | |
|---|---|---|
| JP | 2003-201436 | 7/2003 |
| JP | 2003-213179 | 7/2003 |
| JP | 2003-253167 | 9/2003 |
| JP | 2003-266916 A | 9/2003 |
| JP | 2003-335058 | 11/2003 |
| JP | 2004-306556 A | 11/2004 |
| JP | 2004306557 A | 11/2004 |
| JP | 2005023253 A | 1/2005 |
| JP | 2005-074655 A | 3/2005 |
| JP | 2005-082613 A | 3/2005 |
| JP | 2005052984 A | 3/2005 |

(Continued)

OTHER PUBLICATIONS

Patent English Abstract of Japanese Application 2003-335058 Published Nov. 25, 2003.

(Continued)

*Primary Examiner* — Vu A Nguyen

(74) *Attorney, Agent, or Firm* — Harness, Dickey & Pierce, P.L.C.

(57) ABSTRACT

There is provided a clear ink composition containing a water-insoluble alkanediol having at least seven carbon atoms, a water-soluble alcohol that functions as a dissolution aid for dissolving the water-insoluble alkanediol, water, a fine polymer particle at least containing polyolefin, and a fluorene resin. A colorant is not used.

20 Claims, 1 Drawing Sheet

(56) References Cited

FOREIGN PATENT DOCUMENTS

| | | |
|---|---|---|
| JP | 2005-194500 | 7/2005 |
| JP | 2006-249429 | 9/2006 |
| JP | 2007-277342 | 10/2007 |
| JP | 2007-291399 | 11/2007 |
| JP | 2009-209338 | 9/2009 |
| JP | 2009-297924 | 12/2009 |

OTHER PUBLICATIONS

Machine Translation of Japanese Application 2005-194500 Published Jul. 21, 2005.

Machine Translation of Japanese Application 2003-213179 Published Jul. 30, 2003.

Machine Translation of Japanese Application 2003-253167 Published Sep. 10, 2003.

Patent English Abstract of Japanese Application 2006-249429 Published Sep. 21, 2006.

Patent English Abstract of Japanese Application 2009-209338 Published Sep. 17, 2009.

Patent English Abstract of Japanese Application 2009-297924 Published Dec. 24, 2009.

Patent English Abstract of Japanese Application 2003-201436 Published Jul. 18, 2003.

\* cited by examiner

CLEAR INK COMPOSITION

Priority is claimed under 35 U.S.C. §119 to Japanese Application Ser. No. 2010-128206 filed on Jun. 3, 2010, which is hereby incorporated by reference in its entirety.

BACKGROUND

1. Technical Field

The present invention relates to a clear ink composition, and especially relates to a clear ink composition, which exhibits excellent fixability, enables a record with excellent gloss and color development to be produced, and enables excellent printing stability to be exhibited after passage of time, even in printing on various recording media, particularly a recording medium that exhibits low water absorbability, such as synthetic paper or actual printing paper.

2. Related Art

An ink jet recording method is a printing method in which ink droplets are ejected and then adhere to a recording medium such as paper to perform printing. In recent years, the ink jet recording method has been innovatively developed and has therefore come to be used even in the field of highly precise printing which has been enabled only by silver halide photography and offset printing. An ink jet recording ink has been accordingly developed, which can be applied to a recording medium exhibiting high gloss equal to that of photographic paper, art paper, or the like that has been used in the field of the silver halide photography and the offset printing, namely specialty paper, with the result that an image with gloss equal to that in silver halide photography can be formed. In addition, an ink jet recording ink has been developed, which can be used to provide print quality equal to that of the silver halide photography even in the case where plain paper is used.

In order to form a high-quality image, a technique has been proposed, in which an ink composition and a clear ink composition not containing a colorant are brought into adhering to a recording medium to perform printing. A technique is proposed, for example, in JP-A-2003-335058, in which an ink composition containing a colorant is used to form an image and in which a clear ink composition is then brought into adhering to the image.

Meanwhile, in recent years, a technique for forming an image from digital data has been widely used. Desktop publishing (DTP) is therefore being widely used particularly in the field of printing. Even in the case of DTP printing, color proofs are prepared in advance for the purpose of checking the gloss and color of actually produced prints.

An ink jet recording technique is used to output the color proofs, and a print needs to be formed in the DTP so as to have color that is stably reproduced. In general, specialty paper for ink jet recording is therefore used as recording medium.

The specialty paper for ink jet recording is designed so as to exhibit gloss and color equivalent to those of an output that is actually printed on actual printing paper. A material for the specialty paper is appropriately selected depending on the type of actual printing paper. However, production of the specialty paper which can be used for all types of actual printing paper leads to the increased production costs. For color proof applications, a demand accordingly arises, in which the actual printing paper, rather than the specialty paper, is desired to be used in ink jet printing. If final proofs can be directly printed on the actual printing paper rather than the specialty paper by ink jet printing, proofreading costs can be significantly reduced. In recent years, synthetic paper which is prepared as a result of forming a mixture of polyethylene or polyester and an inorganic filler or the like into a film has been widely used in the field of printing and has attracted attention as an environmentally friendly material with good recyclability.

The actual printing paper is coated paper having a surface on which a coating layer is formed for absorbing an oil-based ink and is characterized in that the coating layer has low ink absorbability. In the case of using an aqueous pigment ink which is commonly used in ink jet printing, a blur and an aggregation spot may be therefore caused in an image owing to poor permeability of the aqueous pigment ink to the recording medium (actual printing paper).

In order to solve this problem, for example, JP-A-2005-194500 discloses a pigment ink which contains a polysiloxane compound as a surfactant and an alkanediol such as 1,2-hexanediol as a dissolution aid to reduce a blur and to provide excellent gloss on specialty paper. In addition, JP-A-2003-213179, JP-A-2003-253167, and JP-A-2006-249429 disclose techniques in which addition of glycerin, a diol such as 1,3-butanediol, or a triol alcohol solvent such as pentanetriol to ink contributes to controlling the permeability of ink to a recording medium and therefore serves to form a high-quality image.

JP-A-2009-209338 discloses an ink composition which contains a colorant, water, water-insoluble alkanediol, water-soluble 1,2-alkanediol, dialkylene glycol, and a surfactant and which can be therefore used to produce a high-quality record without the occurrence of printing defect in printing on a recording medium exhibiting low water absorbability. JP-A-2009-297924 discloses a clear ink composition which at least contains a water-insoluble alkanediol, a water-soluble alcohol, water, and fine polymer particles without addition of a colorant and which therefore exhibits excellent fixability and can be used to produce high-quality record without the occurrence of printing defect. However, an ink composition has not been developed yet, which exhibits excellent fixability, enables a record with excellent gloss and color development to be produced, and enables excellent printing stability to be exhibited after passage of time, even in printing on various recording media, particularly a recording medium with low water absorbability, such as synthetic paper and actual printing paper. Such an ink composition has been therefore desired to be developed.

The inventors have found the following: a clear ink composition is prepared so as to contain a water-insoluble alkanediol, a water-soluble alcohol as a dissolution aid for dissolving the water-insoluble alkanediol (hereinafter simply referred to as "water-soluble alcohol", where appropriate), water, fine polymer particles at least containing polyolefin, and a fluorene resin without addition of a colorant; and by virtue of such a clear ink composition, excellent fixability can be exhibited, a record with excellent gloss and color development can be produced, and excellent printing stability can be exhibited after passage of time, even in printing on various recording media, particularly a recording medium that exhibits low water absorbability, such as synthetic paper or actual printing paper. Embodiments of the invention are provided on the basis of this finding.

SUMMARY

An advantage of some aspects of the invention is that it provides a clear ink composition, which exhibits excellent fixability, enables a record with excellent gloss and color development to be produced, and enables excellent printing stability to be exhibited after passage of time, even in printing on various recording media, particularly a recording medium that exhibits low water absorbability, such as synthetic paper or actual printing paper.

The clear ink composition of embodiments of the invention contains a water-insoluble alkanediol, a water-soluble alcohol as a dissolution aid for dissolving the water-insoluble alkanediol, water, fine polymer particles at least containing polyolefin, and a fluorene resin and does not contain a colorant.

In an advantage of embodiments of the invention, excellent fixability can be exhibited, a record with excellent gloss and color development can be produced, and excellent printing stability can be exhibited after passage of time, even in printing on various recording media, particularly a recording medium that exhibits low water absorbability, such as synthetic paper or actual printing paper.

BRIEF DESCRIPTION OF THE DRAWINGS

The invention will be described with reference to the accompanying drawings, wherein like numbers reference like elements.

DESCRIPTION OF EXEMPLARY EMBODIMENTS

Definition

Figure 1:
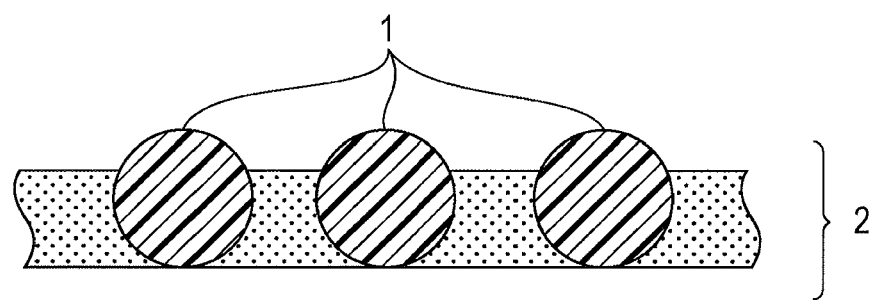
FIG. 1 is a cross-sectional view schematically illustrating a coating film of a recorded image immediately after the adherence and drying of a clear ink composition containing polyolefin wax, the clear ink composition being ejected and then adhering to a recording plane to form the recorded image.

Alkanediols described herein may be linear or branched.

The term "water-soluble" as used herein means that the solubility (amount per water of 100 g) of a solute in water is 10.0 g or more at a temperature of 20° C. The term "water-insoluble" as used herein means that the solubility (amount per water of 100 g) of a solute in water is less than 1.0 g at a temperature of 20° C.

Clear Ink Composition

The clear ink composition of embodiments of the invention contains a water-insoluble alkanediol, a water-soluble alcohol as a dissolution aid for dissolving the water-insoluble alkanediol, water, fine polymer particles at least containing polyolefin, and a fluorene resin and does not contain a colorant. A specific alcohol component is contained in this manner, so that the occurrence of aggregation of ink is suppressed in printing on actual printing paper, particularly art paper, print on demand (POD) paper (for example, Ricoh business coat gloss 100 commercially available from Ricoh Company, Ltd.), or laser printer paper (for example, LPCCTA4 commercially available from SEIKO EPSON CORPORATION) each having relatively high ink absorbability. In addition, even in the case of printing at low resolution, a high-quality image free from white steaks and roughness can be formed, and an ink composition that exhibits ejection stability can be provided.

The term "aggregation" as used herein refers to the local difference in density between similar colors in printing an area [for example, in the case of printing a six inch square area in monochrome (which does not mean the number of ink colors)] and does not mean that a portion uncoated with ink remains on a surface of a recording medium or on a surface of a colored ink film. The term "white streak" as used herein means that local difference does not arise in density between similar colors in printing an area (for example, in the case of printing a six inch square area in monochrome) and that a line which is uncoated with ink remains on a surface of a recording medium or on a surface of a colored ink film so as to extend in the moving direction of a recording head. The term "roughness" or "filling failure" as used herein means that local difference does not arise in density between similar colors in printing an area as described above and that a surface of a recording medium has a portion uncoated with ink with the result that unevenness is caused on a surface of the recording medium and on a surface of a colored ink film.

The reason that containing a specific alcohol component enables a high-quality image free from white streaks and roughness to be formed as described above is still being studied but is considered as follows.

Aggregation of ink in printing on actual printing paper is caused for the reason that the high surface tension of ink dots and a large contact angle between a surface of the actual printing paper and an ink droplet cause the ink to be repelled by the actual printing paper. Even in the case where white steaks and filling failure are caused in low-resolution recording, the surface tension of ink which adheres to a surface of the actual printing paper is decreased with the result that the aggregation of the ink is suppressed.

White streaks or filling failure is caused in a low-resolution recording for the reason that adjacent ink dots adhering to a surface of actual printing paper come into contact with each other and spread over the actual printing paper to create interactive flow of non-dried ink. The interactive ink flow results from the difference in drying time between the ink dots depending on the difference in adhering time between the adjacent ink dots or depending on the sizes of droplets at the time of adhering to the actual printing paper. An ink having low surface tension and low fluidity is accordingly preferably applied to the actual printing paper in order to reduce the aggregation of ink and in order to form a high-quality image free from white streaks or roughness even in low-resolution printing.

In the case where an ink does not contain penetrating humectant and therefore has a reduced fluidity, unfortunately, dots of the ink that adheres to a surface of actual printing paper are quickly dried, and the ink is also rapidly absorbed by the actual printing paper. The time needed for the ink dots to spread over the actual printing paper is therefore reduced with the result that white streaks or filling failure is caused in low-resolution recording.

Water-insoluble Alkanediol

The clear ink composition of embodiments of the invention contains a water-insoluble alkanediol.

In a preferred embodiment of the invention, the water-insoluble alkanediol is an one-terminal alkanediol. In another preferred embodiment of the invention, the water-insoluble alkanediol preferably has seven or more carbon atoms and more preferably has seven to ten carbon atoms. A water-insoluble 1,2-alkanediol is further preferably employed, so that the occurrence of beading can be further effectively suppressed. Examples of the water-insoluble 1,2-alkanediol include 1,2-heptanediol, 1,2-octanediol, 5-methyl-1,2-hexanediol, 4-methyl-1,2-hexanediol, and 4,4-dimethyl-1,2-pentanediol. Among these, 1,2-octanediol is more preferably employed.

The water-insoluble alkanediol is contained in an amount that is preferably in the range from 1.0 to 4.0 weight % with respect to the total weight of the ink composition, more preferably in the range from 2.0 to 4.0 weight %. In order to prevent uneven printing in printing on a recording medium having low ink absorbability, such as actual printing paper, the water-insoluble alkanediol content in the ink composition is preferably determined so as to fall within such a range and particularly so as not to fall below the lower limitation of the range. In addition, the water-insoluble alkanediol content is determined so as not to exceed the upper limitation of the range, and insufficient dissolution of the water-insoluble alkanediol in ink can be therefore prevented.

Water-soluble Alcohol

The clear ink composition of embodiments of the invention contains a specific water-soluble alcohol. The specific water-soluble alcohol of embodiments of the invention is used as a dissolution aid for dissolving the water-insoluble alkanediol. The dissolution aid refers to a material having, for example, the following advantageous effect: the water-soluble alcohol is later added in an amount of 10 g or smaller to a mixture of 10 g which is in an incompatible state such as aggregation or two-phase separation at a temperature of 20° C. and which contains 1,2-octanediol of 10 weight % and pure water of 90 weight %, thereby being able to prepare a transparent solution or being able to enter a colloidal dispersion state. Glycerin is accordingly inadequate even if being one of the water-soluble alcohols.

Any water-soluble alcohol that serves for the advantageous effect of embodiments of the invention can be used, examples of the water-soluble alcohol include one or more materials selected from the group consisting of 1,2,6-hexanetriol, 3-methyl-1,5-pentanetriol, 3-methyl-1,3-butanediol, 3-methyl-1,5-pentanediol, dipropylene glycol, 1,2-hexanediol, and 4-methyl-1,2-pentanediol.

Among these, a water-soluble alkanediol that can be used to prepare a 15% aqueous solution having a surface tension of 28 mN/m or lower is more preferably employed, at least one material selected from the group consisting of 1,2-hexanediol (surface tension: 26.7 mN/m) and dipropylene glycol is preferably employed in particular in view of odor caused during printing, and both of 1,2-hexanediol and dipropylene glycol are further preferably contained.

The water-soluble alcohol is contained in an amount that is preferably in the range from 4.0 to 20.0 weight % with respect to the total weight of the ink composition, more preferably in the range from 7.0 to 12.0 weight %, further preferably in the range from 4.0 to 10.0 weight %. In view of solubility of the water-insoluble alkanediol to ink, the water-soluble alcohol content in the ink composition is preferably determined so as to fall within such a range and particularly so as not to fall below the lower limitation of the range. In addition, the water-soluble alcohol content is preferably determined so as not to exceed the upper limitation of the range in view of the initial viscosity of the ink, and a record with further excellent fixability can be therefore produced even in printing on various recording media, particularly a recording medium exhibiting low water absorbability, such as synthetic paper or actual printing paper.

The content ratio of the water-insoluble alkanediol to the water-soluble alcohol is determined so as to fall within a range preferably from 1:1 to 1:20, more preferably from 1:1 to 1:6. The content ratio is determined so as to fall within such a range, so that the water-insoluble alkanediol can be stably dissolved in ink, thereby improving ejection stability. In addition, in order to succeed in reducing the initial viscosity of the ink and reducing aggregation spots, the content ratio of the water-soluble alcohol is determined so as to fall within such a range and particularly so as not to exceed the upper limitation of the range. In addition, in order to stably dissolve the water-insoluble alkanediol in ink and also in order to suppress change of viscosity and maintain preservation stability after passage of time, the content ratio of the water-soluble alcohol is preferably determined so as to fall within the above range and particularly so as not to fall below the lower limitation of the range.

Fine Polymer Particles

The clear ink composition of embodiments of the invention contains fine polymer particles at least containing polyolefin.

Examples of the polyolefin includes, but are not limited to, polyolefin wax.

Figure 2:
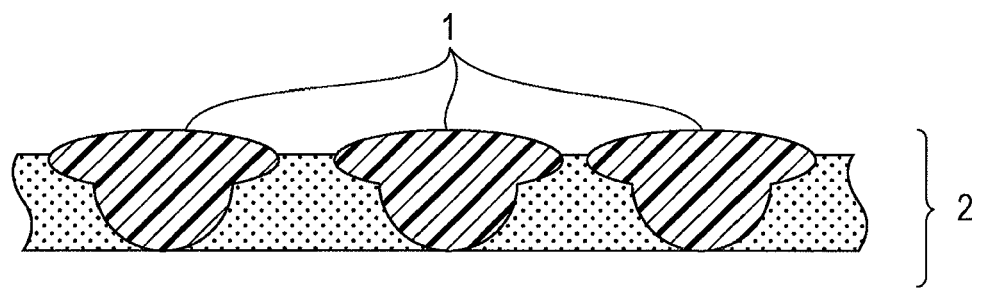
FIG. 2 is a cross-sectional view schematically illustrating a coating film of the recorded image after a wear factor has been applied onto a surface of the coating film of FIG. 1.

The polyolefin wax preferably has a particle diameter larger than the thickness of a film after being subjected to drying, the film being formed as a result of ejection and adherence of the ink composition to a recording plane. The polyolefin wax adheres to a recording medium in the form of a particle so as to protrude from the ink film and is therefore broken as a result of application of pressure to the recording plane, thereby enhancing the smoothness on a surface of the ink film. Specifically, in the case where the clear ink composition adheres to a recording medium and is then dried, a state in which polyolefin particles 1 protrude from an ink film 2 is formed as illustrated in FIG. 1. In this state, in the case where wear factors externally act on a recorded image, the protrusions of the polyolefin wax particles 1 are broken and then spread over a surface of the film as illustrated in FIG. 2. By virtue of this spread wax, effects of wear factors on the recorded image are suppressed, and wear resistance is therefore exhibited.

In terms of fixability and printing stability after passage of time, each of the polyolefin wax particles preferably has a diameter that is in the range from 76 nm to 800 nm, more preferably 150 nm or larger, particularly in the range from 150 nm to 250 nm. Meanwhile, the diameter of each of the polyolefin wax particles refers to a particle diameter (mean value) measured by a microtrac analysis.

Each of the polyolefin wax particles preferably has a melting point or Ring and Ball softening point (JIS K 2207) of 110° C. or larger, particularly in the range from 110° C. to 150° C., thereby easily remaining in the form of a particle on a film that is formed as a result of the adherence of ink to a recording plane.

In the case where the hardness of polyolefin wax particles is measured by needle penetrometer method (JIS K 2207), the polyolefin wax particles each preferably has a hardness of one or larger, more preferably in the range from two to five.

The polyolefin wax particles to be used are not specifically limited as long as the polyolefin wax particles can be held in the form of a particle having a specific diameter in a film (coating film such as a recorded image) that is formed as a result of ejection and adherence of the ink composition to a recording plane, and examples of such polyolefin wax particles include wax that is produced from olefin, such as ethylene, propylene, or butylene, and derivatives thereof and include copolymers thereof. Specific examples of such copolymers include one or more materials selected from polyethylene wax, polypropylene wax, and polybutylene wax.

The polyolefin wax of embodiments of the invention can exist in the ink film on a recording medium so as not to form a film as illustrated in FIG. 1. Although the reason for this phenomenon is being studied, it is considered that the phenomenon is caused for the reason that the temperature of the polyolefin wax does not reach the minimum film forming temperature (MFT) even after the polyolefin wax has been subjected to plasticizing influence resulting from temperature during recording, temperature during drying, or presence of a solvent. The polyolefin wax of embodiments of the invention has a MFT, regardless of the above reason, of preferably 20° C. or larger, more preferably 60° C. or larger. Commercially available products can be employed as such polyolefin wax, and specific examples of such products to be used preferably include CHEMIPEARL series such as CHEMIPEARL W4005 (polyethylene-based wax, particle diameter from 200 nm to 800 nm, Ring and Ball softening point of 110° C., hardness of three in accordance with needle penetrometer method, 40% solid content, and commercially available from Mitsui Chemicals, Inc.). Polyolefin wax disclosed in JP-A-2003-201436 can be also preferably employed.

The fine polymer particles are contained at a solid content concentration that is preferably in the range from 0.2 to 2.0 weight % with respect to the total weight of the ink composition, more preferably in the range from 0.2 to 1.2 weight %, further preferably in the range from 0.4 to 1.0 weight %. In order to provide gloss and color development, the content of the fine polymer particles in the ink composition preferably falls within such a range particularly so as not to exceed the upper limitation of the range. In addition, the content of the fine polymer particles in the ink composition falls within such a range particularly so as not to fall below the lower limitation of the range, so that a record with further excellent fixability can be produced even in printing on various recording media, particularly a recording medium exhibiting low water absorbability, such as synthetic paper or actual printing paper.

Fluorene Resin

The clear ink composition of embodiments of the invention contains a fluorene resin.

Any resin having a fluorene skeleton can be used as the fluorene resin, and such a fluorene resin can be produced, for example, as a result of copolymerizing the following monomer units:

5-isocyanato-1-(isocyanatomethyl)-1,3,3-trimethylcyclohexane (CAS No. 4098-71-9);

2,2'-[9H-fluoren-9-ylidenebis(4,1-phenyleneoxy)]bisethanol (CAS No. 117344-32-8);

3-hydroxy-2-(hydroxymethyl)-2-methylpropionic acid (CAS No. 4767-03-7); and

N,N-diethylethanamine (CAS No. 121-44-8).

The fluorene resin is contained at a solid content concentration that is preferably in the range from 1.0 to 10.0 weight % with respect to the total weight of the ink composition, more preferably in the range from 2.0 to 10.0 weight %, further preferably in the range from 2.0 to 7.0 weight %. The fluorene resin content falls within such a range particularly so as not to exceed the upper limitation of the range, so that an ink composition which exhibits excellent recoverability from clogging can be produced. In addition, the fluorene resin content falls within such a range particularly so as not to fall below the lower limitation of the range, so that an ink composition which serves to provide further excellent gloss can be produced.

The polyolefin wax of embodiments of the invention exists in an ink film on a recording medium so as not to form a film as illustrated in FIG. 1, and gloss may be therefore reduced resulting from diffuse reflection. The reduction in gloss can be, however, prevented by use of the polyolefin wax in combination with the fluorene resin. In order to fix the polyolefin wax on a recording medium, the fluorene resin is required to be contained within the above range. In addition, the fluorene resin is characterized in that high refractive index is exhibited and therefore contributes to enhancement of color development in a colored ink. The polyolefin wax of embodiments of the invention is accordingly preferably employed.

The content ratio of the fluorene resin to the fine polymer particles is determined so as to fall within the range preferably from 3:1 to 30:1, more preferably from 5:1 to 16:1. The content ratio is determined so as to fall within such a range, so that excellent fixing is exhibited and so that a record with further excellent gloss and color development can be produced, even in printing on various recording media, particularly a recording medium that exhibits low water absorbability, such as synthetic paper or actual printing paper.

Surfactant

The clear ink composition of embodiments of the invention preferably further contains a surfactant. Owing to using a surfactant, an image having excellent gloss can be formed on a recording medium having a surface coated with a resin for receiving ink, particularly a recording medium such as photographic paper or the like in which weight is put on gloss. In particular, even in the case of using a recording medium having a surface with a receiving layer provided with a coating layer for receiving an oil-based ink, such as actual printing paper, bleeding between colors can be prevented from occurring, and whitening due to reflected light can be prevented from being caused with increase in the amount of an adhering ink. Meanwhile, it is noted that the surfactant is preferably added to the clear ink composition of embodiments of the invention such that a dynamic surface tension of 26 mN/m or lower is exhibited. Dynamic surface tension can be measured, for example, by using Bubble Pressure Dynamic Tensiometer BP2 (commercially available from KRUSS GmbH).

A polyorganosiloxane surfactant can be preferably employed as the surfactant used in embodiments of the invention. In formation of a recorded image, use of such a surfactant enables wettability to a surface of a recording medium to be increased, thereby being able to improve the permeability of ink. In the case of using the polyorganosiloxane surfactant, because the ink composition may contain the two types of alcohol solvents as described above, the solubility of the surfactant in ink is improved, and generation of insoluble substances can be suppressed, thereby being able to providing an ink composition that exhibits further excellent ejection stability.

Commercially available products may be employed as such a surfactant, and examples of the commercially available products include OLFINE PD-501 (from Nissin Chemical Industry Co., Ltd.), OLFINE PD-570 (from Nissin Chemical Industry Co., Ltd.), BYK-347 (from BYK Japan KK), and BYK-348 (from BYK Japan KK).

As the polyorganosiloxane surfactant, the ink composition preferably contains one or more compounds represented by the following formula (I):

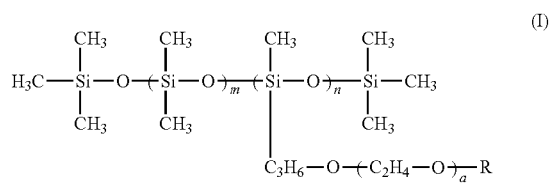

(wherein R represents a hydrogen atom or a methyl group, a represents an integer from 2 to 13, m represents an integer from 2 to 70, and n represents an integer from 1 to 8) or preferably contains one or more compounds represented by the formula (I), in which R is a hydrogen atom or a methyl group, a is an integer from 2 to 11, m is an integer from 2 to 50, and n is an integer from 1 to 5. Furthermore, the ink composition more preferably contains one or more compounds represented by the formula (I), in which R is a hydrogen atom or a methyl group, a is an integer from 2 to 13, m is an integer from 2 to 50, and n is an integer from 1 to 5. Furthermore, the ink composition more preferably contains one or more compounds represented by the formula (I), in which R is a hydrogen atom or a methyl group, a is an integer from 2 to 13, m is an integer from 2 to 50, and n is an integer from 1 to 8. Furthermore, the ink composition more preferably contains one or more compounds represented by the formula (I), in which R is a methyl group, a is an integer from 6 to 18, m is 0 to 4, and n is 1 or 2. Furthermore, the ink composition more preferably contains one or more compounds represented by the formula (I), in which R is a methyl group, a is an integer from 6 to 18, m is 0, and n is 1. By virtue of using such a specific polyorganosiloxane surfactant, a problem of ink aggregation spots can be further overcome even in printing on actual printing paper as a recording medium.

Examples of a compound more preferably used as the compound represented by the formula (I) include a compound in which a is an integer from 2 to 5, m is an integer from 20 to 40, and n is an integer from 2 to 4; a compound in which a is an integer from 7 to 11, m is an integer from 30 to 50, and n is an integer from 3 to 5; a compound in which a is an integer from 9 to 13, m is an integer from 2 to 4, and n is an integer from 1 to 2; and a compound in which a is an integer from 6 to 10, m is an integer from 10 to 20, and n is an integer from 4 to 8. By virtue of using such a compound, a problem of ink aggregation spots can be further efficiently overcome.

Examples of a compound further preferably used as the compound represented by the formula (I) include a compound in which R is a hydrogen atom, a is an integer from 2 to 5, m is an integer from 20 to 40, and n is an integer from 2 to 4; and a compound in which a is an integer from 7 to 11, m is an integer from 30 to 50, and n is an integer from 3 to 5. By virtue of using such a compound, problems of ink aggregation spots and ink blurring can be further efficiently overcome.

Examples of a compound further preferably used as the compound represented by the formula (I) include a compound in which R is a methyl group, a is an integer from 9 to 13, m is an integer from 2 to 4, and n is an integer from 1 to 2; and a compound in which a is an integer from 6 to 10, m is an integer from 10 to 20, and n is an integer from 4 to 8. By virtue of using such a compound, problems of ink aggregation spots and ink blurring can be further efficiently overcome.

Examples of a compound further preferably used as the compound represented by the formula (I) include a compound in which R is a methyl group, a is an integer from 6 to 12, m is 0, and n is 1. By virtue of using such a compound, problems of ink aggregation spots and ink blurring can be further efficiently overcome.

Examples of a compound most preferably used as the compound represented by the formula (I) include a mixture of: a compound in which R is a hydrogen atom, a is an integer from 7 to 11, m is an integer from 30 to 50, and n is an integer from 3 to 5; a compound in which R is a methyl group, a is an integer from 9 to 13, m is an integer from 2 to 4, and n is an integer from 1 to 2; and a compound in which R is a methyl group, a is an integer from 6 to 10, m is an integer from 10 to 20, and n is an integer from 4 to 8. By virtue of using such a compound, problems of ink aggregation spots and ink blurring can be further advantageously overcome.

Examples of a compound most preferably used as the compound represented by the formula (I) include a mixture of: a compound in which R is a hydrogen atom, a is an integer from 7 to 11, m is an integer from 30 to 50, and n is an integer from 3 to 5; a compound in which R is a methyl group, a is an integer from 9 to 13, m is an integer from 2 to 4, and n is an integer from 1 to 2; and a compound in which R is a methyl group, a is an integer from 6 to 18, m is 0, and n is 1. By virtue of using such a compound, problems of ink aggregation spots and ink blurring can be further advantageously overcome.

The polyorganosiloxane surfactant is not specifically limited, but in the case where the ink composition is prepared so as to contain glycerin of 20 weight %, 1,2-hexanediol of 10 weight %, the polyorganosiloxane surfactant of 0.1 weight %, and water of 69.9 weight %, an polyorganosiloxane surfactant which enables the ink composition to exhibit a dynamic surface tension of 26 mN/m or lower at a frequency of 1 Hz is preferably employed. Dynamic surface tension can be measured, for example, by using Bubble Pressure Dynamic Tensiometer BP2 (commercially available from KRUSS GmbH).

The surfactant is contained in the clear ink composition of embodiments the invention in an amount that is preferably in the range from 0.01 to 1.0 weight %, more preferably in the range from 0.05 to 0.50 weight %. In the case where the surfactant containing a methyl group as R and the surfactant containing a hydrogen atom as R are used in combination, blurring of a dot shape is suppressed at the time of the adherence of ink droplets of the clear ink composition to a recording medium, and such combination is therefore more preferably employed. In particular, in the case of using the surfactant containing a methyl group as R, the surfactant content is preferably increased as compared to the case of using the surfactant containing a hydrogen atom as R, in view of ink aggregation spots.

The content of the surfactant containing a hydrogen atom as R is more preferably increased relative to the content of the surfactant containing a methyl group as R. In this case, problems of ink aggregation spots and ink blurring can be efficiently overcome even in printing on actual printing paper which easily repels ink and which has a low penetration rate, such as cast coated paper or the like.

A gemini surfactant can be preferably employed as the surfactant used in embodiments of the invention. The gemini surfactant is used in combination with the water-insoluble alkanediol, so that a water-insoluble solvent can be uniformly dispersed, thereby being able to reduce the initial viscosity of ink. This advantage therefore allows a colorant, an anti-clogging agent, or the like to be contained in the ink composition in an increased amount. Furthermore, an image with good color development can be formed not only on plain paper but also on a recording medium having a porous surface coated with resin or particles for absorbing ink. In particular, even in the case of using a recording medium having a surface with a receiving layer provided with a coating layer for receiving an oil-based ink, such as actual printing paper, bleeding between colors can be prevented from occurring, and uneven color density due to the flow of ink between dots can be prevented from being caused with increase in the amount of an adhering ink. The reason for this phenomenon is being studied, but it is considered that the gemini surfactant and the water-insoluble solvent form extremely stable oil gel owing to the good orientation of the gemini surfactant and that the colorant therefore loses fluidity. The advantageous effect provided by the use of the gemini surfactant can be accordingly well utilized in the case where the water-insoluble solvent is contained in a large amount. The term "gemini surfactant" as used herein refers to a surfactant having a structure in which two surfactant molecules are connected to each other through a linker.

The gemini surfactant is preferably a double-chain triple-hydrophilic group surfactant in which a pair of single-chain surfactant moieties having hydrophilic groups are connected to each other through a linker having a hydrophilic group. The hydrophilic groups of the single-chain surfactant moieties are preferably acidic amino acid residues. The linker is preferably a basic amino acid residue. Specific examples of such a surfactant include a surfactant in which the single-chain surfactant moieties having the hydrophilic groups such as glutamic or aspartic acid residues are connected to each other through the linker such as an arginine, lysine, or histidine residue. The gemini surfactant to be used in embodiments of the invention is preferably represented by the following formula (II):

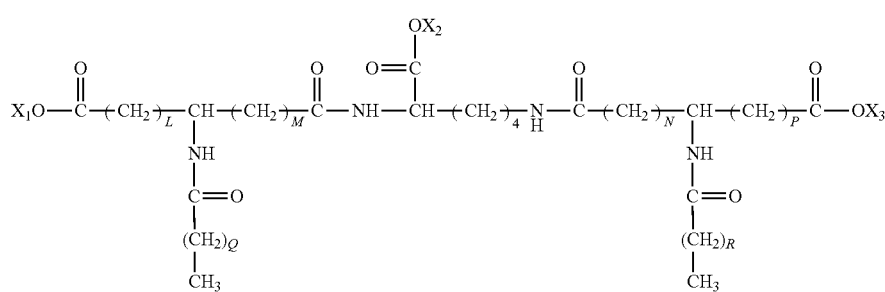

(wherein $X_1$, $X_2$, and $X_3$ each independently represent a hydrogen atom or an alkali metal but do not each simultaneously represent hydrogen atom or alkali metal; L and M each independently represent 0 or 2 but do not each simultaneously represent 0 or 2; N and P each independently represent 0 or 2 but do not each simultaneously represent 0 or 2; and Q and R each represents an integer from 8 to 18).

In the formula (II), the alkali metal is preferably sodium, and Q and R are each preferably 10. Examples of such a gemini surfactant include a sodium salt of a condensation product of N-lauroyl-L-glutamic acid with L-lysine. Commercially available products may be employed as the gemini surfactant represented by the formula (II). Preferable examples of the commercially available products to be used include Pellicer L-30 (from Asahi Kasei Chemicals Corporation) which is an aqueous solution containing the sodium salt (30%) of the condensation product of N-lauroyl-L-glutamic acid with L-lysine.

In embodiments of the invention, the use of the gemini surfactant allows, in formation of a recorded image, the ink composition to have high wettability to a recording medium and to exhibit high permeability to the recording medium. The problem of the ink aggregation spots can be therefore efficiently overcome even in the case of printing an image on a recording medium such as actual printing paper. Because the ink composition contains the water-insoluble alkanediol, the solubility of the surfactant in ink is increased, and an insoluble substance can be prevented from being generated. The ink composition having good ejection stability can be therefore provided.

The gemini surfactant is contained in the ink composition in an amount that is preferably in the range from 0.01 to 1.0 weight %, more preferably in the range from 0.05 to 0.50 weight %.

In an preferred embodiment of the invention, the ink composition may contain both the polyorganosiloxane surfactant and the gemini surfactant. The ink composition of embodiments of the invention contains each of these two surfactants, so that a high-quality image can be formed without the occurrence of bleeding and beading. In addition, the two surfactants effectively function as an adjuster for the varied fluidity of the ink composition resulting from a pigment type or the amount of a resin component.

The clear ink composition of embodiments of the invention may further contain another surfactant, and specific examples of such another surfactant include an acetylenic glycol surfactant, anionic surfactant, nonionic surfactant, and ampholytic surfactant.

Among these, examples of the acetylene glycol surfactant include 2,4,7,9-tetramethyl-5-decyne-4,7-diol, 3,6-dimethyl-4-octyne-3,6-diol, 3,5-dimethyl-1-hexyne-3-ol, and 2,4-dimethyl-5-hexyne-3-ol. Commercially available products may be employed as the acetylene glycol surfactant, and examples of such commercially available products include Olfine E1010, STG, or Y (each being the name of a product from Nissin Chemical Industry Co., Ltd.); and Surfynol 61, 104, 82, 465, 485, or TG (each being the name of a product from Air Products and Chemicals, Inc.).

Water and Other Components

The clear ink composition of embodiments of the invention contains the above specific alcohol solvent, other various additives, and water as a solvent. Pure water such as ion-exchanged water, ultrafiltrated water, reverse osmosis water, or distilled water or ultrapure water is preferably used as such water. In particular, water that is prepared as a result of sterilizing the above type of water through ultraviolet irradiation, hydrogen peroxide addition, or the like can serve to prevent the growth of fungus and bacteria over a long period of time and is therefore preferably employed.

The clear ink composition of embodiments of the invention preferably contains a penetrating solvent in addition to the above components.

The penetrating solvent as used herein refers to a penetrating solvent that is used in typical ink jet recording inks, and examples of such a penetrating solvent include glycol ethers.

Specific examples of glycol ethers include ethylene glycol monomethyl ether, ethylene glycol monoethyl ether, ethylene glycol mono-iso-propyl ether, ethylene glycol mono-n-butyl ether, ethylene glycol mono-iso-butyl ether, ethylene glycol mono-tert-butyl ether, ethylene glycol monomethyl ether acetate, diethylene glycol monomethyl ether, diethylene glycol monoethyl ether, diethylene glycol mono-n-propyl ether, diethylene glycol mono-iso-propyl ether, diethylene glycol mono-n-butyl ether, diethylene glycol mono-tert-butyl ether, triethylene glycol mono-n-butyl ether, propylene glycol monomethyl ether, propylene glycol monoethyl ether, propylene glycol mono-n-propyl ether, propylene glycol mono-iso-propyl ether, propylene glycol mono-n-butyl ether, propylene glycol mono-tert-butyl ether, dipropylene glycol monomethyl ether, dipropylene glycol monoethyl ether, dipropylene glycol mono-n-propyl ether, dipropylene glycol-iso-propyl ether, dipropylene glycol mono-n-butyl ether, dipropylene glycol mono-tert-butyl ether, and 1-methyl-1-methoxybutanol. These may be used alone or in combination of two or more.

Among the above glycol ethers, alkyl ethers of polyhydric alcohols are preferably employed. In particular, ethylene glycol monoethyl ether, ethylene glycol mono-n-butyl ether, diethylene glycol monomethyl ether, diethylene glycol monoethyl ether, diethylene glycol mono-n-butyl ether, triethylene glycol monomethyl ether, triethylene glycol monoethyl ether, or triethylene glycol mono-n-butyl ether is preferably employed. Triethylene glycol mono-n-butyl ether is more preferably employed.

The additive amount of the penetrating solvent may be appropriately determined. The penetrating solvent is added in an amount that is preferably in the range approximately from 0.1 to 30 weight %, more preferably in the range approximately from 1 to 20 weight %.

The clear ink composition of embodiments of the invention may contain a recording medium-solubilizing agent in addition to the above components.

Pyrrolidones such as N-methyl-2-pyrrolidone can be preferably employed as the recording medium-solubilizing agent. The additive amount of the recording medium-solubilizing agent may be appropriately determined. The recording medium-solubilizing agent is added in an amount that is preferably in the range approximately from 0.1 to 30 weight %, more preferably in the range approximately from 1 to 20 weight %.

It is preferable that the clear ink composition of embodiments of the invention does not substantially contain a humectant. The humectant has the function to prevent ink from being dried and solidified in an ink jet nozzle or the like. In the case where ink is dropped on synthetic paper having a film with low ink absorbability, the ink is not therefore dried with the result that a problem is caused in high-speed printing in some cases. In the case of using ink containing a humectant, the ink adheres to a recording medium in a state in which the ink that has been previously applied is not absorbed and remains on a surface of the recording medium, and aggregation spots may be therefore generated.

In embodiments of the invention, in the case of using such a recording medium having low ink absorbability, it is therefore preferable that the humectant is not substantially contained. Even in the case where ink is dried and solidified in an ink jet nozzle, the solidified ink can be re-dissolved with a solution containing a humectant.

In particular, in the case of using synthetic paper or the like having low ink absorbability, it is preferable that a humectant which is in a liquid state at a temperature of 20° C. is not substantially contained.

The term "humectant" as used herein refers to a humectant that is used for typical ink jet recording inks.

Specific examples of the humectant include glycerin; ethylene glycol; diethylene glycol; triethylene glycol; propylene glycol; water-soluble alkanediols having 3 to 5 carbon atoms, such as 1,3-propanediol, 3-methyl-1,3-butanediol, 1,3-butanediol, and 1,2-pentanediol; trimethylolpropane; trimthylolmethane; and trimethylolethane. Among these, glycerin is preferably employed in view of influence on surface tension at a frequency of 10 Hz. The expression "substantially not contain" as used herein refers to a state in which the humectant is added in an amount less than 1 weight % with respect to the total weight of the ink composition. Although persons skilled in the art well know that the penetrating solvent also partially functions as a humectant, it should be herein understood that the penetrating solvent is not included in the humectant.

The ink composition of embodiments of invention may further contain a nozzle clogging preventive, preservative, antifungal agent, antioxidant, electric conductivity adjustor, pH adjustor, viscosity modifier, surface tension modifier, oxygen absorber, or the like.

Examples of the preservative or antifungal agent include sodium benzoate, pentachlorophenol sodium, 2-pyridinethiol-1-oxide sodium, sodium sorbate, sodium dehydroacetate, and 1,2-dibenzinethiazolin-3-one (Proxel CRL, Proxel BND, Proxel GXL, Proxel XL-2, and Proxel TN commercially available from ICI Corporation).

Examples of the pH adjustor, dissolution aid, or antioxidant include amines, such as diethanolamine, triethanolamine, propanolamine, and morpholine, and modification products thereof; inorganic salts such as potassium hydroxide, sodium hydroxide, and lithium hydroxide; ammonium hydroxide; quaternary ammonium hydroxide such as tetramethylammonium; salts of carbonic acid such as potassium carbonate, sodium carbonate, and lithium carbonate; salts of phosphoric acid; N-methyl-2-pyrrolidone; urea compounds such as urea, thiourea, and tetramethylurea; allophanates such as allophanate and methyl allophanate; biurets such as biuret, dimethylbiuret, and tetramethylbiuret; and L-ascorbic acid and salts thereof.

The clear ink composition of embodiments of the invention may contain an antioxidant and an ultraviolet absorber, and examples thereof include Tinuvins 328, 900, 1130, 384, 292, 123, 144, 622, 770, and 292; Irgacors 252 and 153; Irganoxes 1010, 1076, 1035, and MD 1024 (each being commercially available from Ciba Specialty Chemicals, Inc.); and lanthanide oxides.

Ink Set

The ink set of embodiments of the invention at least contains the above clear ink composition, a black ink composition, a yellow ink composition, a magenta ink composition, and a cyan ink composition. The clear ink composition is used in combination with such color ink compositions, thereby being able to produce a record exhibiting excellent fixability and excellent gloss and color development even in printing on various recording media, particularly a recording medium that exhibits low water absorbability, such as synthetic paper or actual printing paper.

In order to well utilize an advantageous effect of embodiments of the invention, for example, the clear ink composition is preferably used in combination with an ink composition disclosed in JP-A-2009-209338. An embodiment of the black ink composition that is preferably used in particular will be hereinafter described.

Examples of a pigment contained in the black ink composition include inorganic pigments such as carbons, for example, lampblack (C. I. Pigment Black 6), acetylene black, furnace black (C. I. Pigment Black 7), channel black (C. I. Pigment Black 7), and carbon black (C. I. Pigment Black 7), and iron oxide pigments; and organic pigments such as aniline black (C. I. Pigment Black 1). In embodiments of the invention, carbon black is preferably used. Specific examples of the carbon black include #2650, #2600, #2300, #2200, #1000, #980, #970, #966, #960, #950, #900, #850, MCF-88, #55, #52, #47, #45, #45L, #44, #33, #32, and #30 (each being commercially available from Mitsubishi Chemical Corporation); Special Blacks 4A and 550 and Printexes 95, 90, 85, 80, 75, 45, and 40 (each being commercially available from Degussa); Regal 660, Rmogul L, Monarchs 1400, 1300, 1100, 800, and 900 (each being commercially available from Cabot Corporation); and Ravens 7000, 5750, 5250, 3500, 2500 ULTRA, 2000, 1500, 1255, 1200, 1190 ULTRA, 1170, and 1100 ULTRA and Raven 5000 UIII, (each being commercially available from Columbian Chemicals Company). Among these, in particular, at least one of C. I. Pigment Black 6 and C. I. Pigment Black 7 is used, thereby being able to form an image having a further excellent color phase.

The solid content concentration of the pigment contained in the black ink composition used for the ink set of embodiments of the invention is not specifically limited and is preferably 6 weight % or larger in terms of securing the color development in a recorded image.

The black ink composition which can be preferably used in embodiments of the invention contains an alcohol solvent and specifically contains at least two types of organic solvents including a water-soluble alcohol solvent and a water-insoluble alcohol solvent. Such two types of alcohol solvents are contained as an essential component, thereby being able to suppress the occurrence of ink aggregation in printing on actual printing paper, particularly art paper, POD paper (for example, Ricoh business coat gloss 100 commercially available from Ricoh Company, Ltd.), or laser printer paper (for example, LPCCTA4 commercially available from SEIKO EPSON CORPORATION) each having relatively high ink absorbability. In addition, a high-quality image free from white streaks and roughness can be formed even in low-resolution printing.

Although the water-soluble alcohol solvent used in embodiments of the invention is not specifically limited, at least one water-soluble alkanediol or a combination of at least one water-soluble alkanediol and at least one water-soluble alkanetriol is preferably employed.

The water-soluble alkanediol preferably includes at least one alkanediol having four to six carbon atoms in its main chain and more preferably includes 1,2-alkanediol which may have a branched chain and 1,3-alkanediol which may have a branched chain. Examples of the water-soluble alkanediol include 1,2-hexanediol, 1,2-pentanediol, 1,2-butanediol, 4-methyl-1,2-pentanediol, 3,3-dimethyl-1,2-butanediol, 3-methyl-1,3-butanediol, and 2-methyl-1,3-propanediol. Among these, a water-soluble alkanediol that can be used to prepare a 15% aqueous solution having a surface tension of 28 mN/m or lower is more preferably employed, and 1,2-hexanediol (surface tension: 26.7 mN/m), 4-methyl-1,2-pentanediol (surface tension: 25.4 mN/m), and 3,3-dimethyl-1,2-butanediol (surface tension: 26.1 mN/m) are preferably employed in particular. In view of odor during printing, 1,2-hexanediol is preferably employed.

The water-soluble alkanetriol is a substance which exhibits viscosity similar to that of glycerin. In addition, the water-soluble alkanetriol functions as a penetrating lubricant which exhibits surface tension lower than that of glycerin. For example, a 10% aqueous solution of 1,2,6-hexanetriol has a surface tension of 54 mN/m, and a 10% aqueous solution of 3-methylpentane-1,3,5-triol (commercially available from TOKYO CHEMICAL INDUSTRY CO., LTD., CAS: 7564-64-9) has a surface tension of 49 mN/m.

Alkanetriol having five or more carbon atoms in its main chain is preferably employed as the water-soluble alkanetriol, and examples of such alkanetriol include 1,2,6-hexanetriol and 3-methylpentane-1,3,5-triol. In particular, 1,2,6-hexanetriol is preferably employed in view of intermittently delivering ink, and 3-methylpentane-1,3,5-triol is preferably employed in view of the fixability of ink.

The water-insoluble alcohol solvent used in embodiments of the invention is preferably an alkanediol, more preferably an alkanediol having 7 or more carbon atoms, and further preferably an alkanediol having 7 to 10 carbon atoms. Examples of such an alkanediol include 1,2-heptanediol, 1,2-octanediol, 5-methyl-1,2-hexanediol, 4-methyl-1,2-hexanediol, and 4,4-dimethyl-1,2-pentanediol. Among these, 1,2-octanediol is more preferably employed.

In the two types of alcohol solvents, the content ratio of the water-insoluble alcohol solvent to the water-soluble alcohol solvent is determined so as to preferably fall within the range from 1:1 to 1:6, more preferably the range from 1:1 to 1:3. Within this range, the water-insoluble alcohol solvent can be stably dissolved in ink, and ejection stability is therefore improved. In contrast, in the case where the content ratio of the water-soluble alcohol solvent exceeds the range, difficulties arise in decrease in both the initial viscosity of ink and aggregation spots. In the case where the content ratio of the water-soluble alcohol solvent falls below the range, a difficulty arises in stably dissolving the water-insoluble alcohol solvent in ink with the result that difficulties arise in suppressing viscosity change with the passage of time and maintaining preservation stability.

The content ratio of the water-insoluble alcohol solvent to the water-soluble alkanediol is determined so as to preferably fall within the range from 1:1 to 1:6, more preferably the range from 1:1 to 1:3. Within this range, the water-insoluble alcohol solvent can be stably dissolved in ink, and ejection stability is therefore improved. In contrast, in the case where the content ratio of the water-soluble alkanediol exceeds the range, difficulties arise in decrease in both the initial viscosity of ink and aggregation spots. In the case where the content ratio of the water-soluble alkanediol falls below the range, a difficulty arises in stably dissolving the water-insoluble alcohol solvent in ink with the result that difficulties arise in suppressing viscosity change with the passage of time and maintaining preservation stability.

The content ratio of the water-insoluble alcohol solvent to the water-soluble alkanetriol is preferably determined so as to fall within the range from 1:1 to 1:8, more preferably the range from 1:1 to 1:6. Within this range, the initial viscosity of ink can be decreased, and excellent recoverability from clogging is provided. In contrast, in the case where the content ratio of the water-soluble alkanetriol exceeds the range, the initial viscosity of ink is increased, and drying properties are therefore decreased. In the case where the content ratio of the water-soluble alkanetriol falls below the range, the recoverability from clogging is impaired, and drying properties are enhanced. A time for ink to spread cannot be therefore secured, and a recording medium cannot be accordingly coated with ink, resulting in the easy occurrence of white streaks.

The content ratio of the water-soluble alkanediol to the water-soluble alkanetriol is preferably determined so as to fall within the range from 2:1 to 1:18, more preferably the range from 1:1 to 1:3. Within this range, the occurrence of white streaks and roughness can be further suppressed in printing on actual printing paper at low resolution. In contrast, in the case where the content ratio of the water-soluble alkanetriol exceeds the range, the initial viscosity of ink is increased, and drying properties are therefore decreased. In the case where the content ratio of the water-soluble alkanetriol falls below the range, recoverability from clogging is impaired, and drying properties are enhanced. A time for ink to spread cannot be therefore secured, and a recording medium cannot be accordingly coated with ink, resulting in the easy occurrence of white streaks.

Furthermore, in embodiments of the invention, the ink composition is preferably prepared so as to contain the water-insoluble alcohol solvent and the water-soluble alcohol solvent in a total amount of 11 weight % or smaller with respect to the total weight of the ink composition. Within this range, the occurrence of aggregation spots is precluded in printing on a recording medium having low ink absorbability, such as actual printing paper, and excellent ejection stability is provided.

In addition, in embodiments of the invention, the ink composition is preferably prepared so as to contain the water-insoluble alcohol solvent and the water-soluble alkanediol in a total amount of 11 weight % or smaller with respect to the total weight of the ink composition. Within this range, the occurrence of aggregation spots is precluded in printing on a recording medium having low ink absorbability, such as actual printing paper, and excellent ejection stability is provided.

Moreover, in embodiments of the invention, the ink composition is preferably prepared so as to contain the water-insoluble alcohol solvent and the water-soluble alkanetriol in a total amount of 11 weight % or smaller with respect to the total weight of the ink composition. Within this range, the occurrence of aggregation spots is precluded in printing on a recording medium having low ink absorbability, such as actual printing paper. In addition, excellent ejection stability is provided, and the occurrence of curling of paper is efficiently suppressed.

The water-soluble alcohol solvent is contained in an amount that is preferably in the range from 1 to 11 weight % with respect to the total weight of the ink composition, more preferably in the range from 4 to 8 weight %. In the case where the content is less than 4 weight %, the water-insoluble alcohol solvent may not be dissolved in ink. On the other hand, in the case where the content exceeds 8 weight %, the initial viscosity of ink is undesirably increased in some cases.

The water-insoluble alcohol solvent is contained in an amount that is preferably in the range from 1 to 3 weight % with respect to the total weight of the ink composition, more preferably in the range from 1.5 to 2.5 weight %. In the case where the content is less than 1 weight %, aggregation sports may be generated in printing on a recording medium having low ink absorbability, such as actual printing paper.

In the case where the content exceeds 3 weight %, the water-insoluble alcohol solvent may not be completely dissolved in ink.

The water-soluble alkanediol is contained in an amount that is preferably in the range from 1 to 11 weight % with respect to the total weight of the ink composition, more preferably in the range from 3 to 8 weight %. In the case where the content is less than 3 weight %, the water-insoluble alcohol solvent may not be dissolved in ink. On the other hand, in the case where the content exceeds 8 weight %, the initial viscosity of ink is undesirably increased in some cases.

The water-soluble alkanetriol is contained in an amount that is preferably in the range from 1 to 11 weight % with respect to the total weight of the ink composition, more preferably in the range from 3 to 8 weight %. In the case where the content is less than 3 weight %, white streaks and roughness may be generated in printing on actual printing paper at low resolution. On the other hand, in the case where the content exceeds 8 weight %, insufficient drying properties may be exhibited in a record immediately after printing has been finished.

The black ink composition contains a surfactant as an essential component. Owing to using a surfactant, an image having excellent gloss can be formed on a recording medium having a surface coated with a resin for receiving ink, particularly a recording medium such as photographic paper or the like in which weight is put on gloss. In particular, even in the case of using a recording medium having a surface with a receiving layer provided with a coating layer for receiving an oil-based ink, such as actual printing paper, bleeding between colors can be prevented from occurring, and whitening due to reflected light can be prevented from being caused with increase in the amount of an adhering ink. The same surfactant as used for the clear ink composition can be employed.

The black ink composition preferably contains, as a dispersant for dispersing pigments, at least one resin selected from styrene-acrylic acid copolymer resins, urethane resins, and fluorene resins. These copolymer resins adsorb on pigments, thereby enhancing dispersibility.

Specific examples of hydrophobic monomers in the copolymer resins include methyl acrylate, methyl methacrylate, ethyl acrylate, ethyl methacrylate, n-propyl acrylate, n-propyl methacrylate, iso-propyl acrylate, iso-propyl methacrylate, n-butyl acrylate, n-butyl methacrylate, sec-butyl acrylate, sec-butyl methacrylate, tert-butyl acrylate, tert-butyl methacrylate, n-hexyl acrylate, n-hexyl methacrylate, n-octyl acrylate, n-octyl methacrylate, iso-octyl acrylate, iso-octyl methacrylate, 2-ethylhexyl acrylate, 2-ethylhexyl methacrylate, decyl acrylate, decyl methacrylate, lauryl acrylate, lauryl methacrylate, stearyl acrylate, stearyl methacrylate, 2-hydroxyethyl acrylate, 2-hydroxyethyl methacrylate, 2-hydroxypropyl acrylate, 2-hydroxypropyl methacrylate, 2-dimethylaminoethyl acrylate, 2-dimethylaminoethyl methacrylate, 2-diethylaminoethyl acrylate, 2-diethylaminoethyl methacrylate, glycidyl acrylate, glycidyl methacrylate, ally acrylate, ally methacrylate, cyclohexyl acrylate, cyclohexyl methacrylate, phenyl acrylate, phenyl methacrylate, nonylphenyl acrylate, nonylphenyl methacrylate, benzyl acrylate, benzyl methacrylate, dicyclopentenyl acrylate, dicyclopentenyl methacrylate, bornyl acrylate, bornyl methacrylate, 1,3-butanediol diacrylate, 1,3-butanediol dimethacrylate, 1,4-butanediol diacrylate, 1,4-butanediol dimethacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentyl glycol diacrylate, 1,6-hexanediol diacrylate, 1,6-hexanediol dimethacrylate, dipropylene glycol diacrylate, dipropylene glycol dimethacrylate, trimethylolpropane triacrylate, trimethylolpropane trimethacrylate, glycerol acrylate, glycerol methacrylate, styrene, methylstyrene, and vinyltoluene. These monomers may be used alone or in combination of two or more.

Specific examples of hydrophilic monomers include acrylic acid, methacrylic acid, maleic acid, and itaconic acid.

In view of balancing the gloss of a color image, prevention of bronzing, and the preservation stability of the ink composition and forming a color image with enhanced gloss, the copolymer resin of the hydrophobic monomer and the hydrophilic monomer is preferably at least any one of a styrene-(meth)acrylic acid copolymer resin, a styrene-methylstyrene-(meth)acrylic acid copolymer resin, a styrene-maleic acid copolymer resin, a (meth)acrylic acid-(meth)acrylate copolymer resin, and a styrene-(meth)acrylic acid-(meth)acrylate copolymer resin.

The copolymer resin may be a resin (styrene-acrylic acid resin) containing a polymer produced by the reaction of styrene with acrylic acid or an acrylate. Alternatively, the copolymer resin may be a water-soluble acrylic acid resin or may be a sodium, potassium, or ammonium salt of one of these resins.

In view of balancing the gloss of a color image, prevention of bronzing, and the preservation stability of the ink composition and forming a color image with enhanced gloss, such a copolymer resin is contained in an amount that is preferably in the range from 10 to 50 parts by weight with respect to 100 parts by weight of the pigment, more preferably in the range from 10 to 35 parts by weight.

In embodiments of the invention, an urethane resin is contained as a pigment dispersant, thereby being able to balance the gloss of a color image, prevention of bronzing, and the preservation stability of the ink composition and being able to form a color images with enhanced gloss. The urethane resin is a resin containing a polymer produced by the reaction of a diisocyanate compound with a diol compound, and a resin containing at least one of a urethane bond and amide bond and containing an acidic group is preferably employed in embodiments of the invention.

Examples of the diisocyanate compound include araliphatic diisocyanates such as hexamethylene diisocyanate and 2,2,4-trimethylhexamethylene diisocyanate; aromatic diisocyanates such as tolylene diisocyanate and phenylmethane diisocyanate; and modifications thereof.

Examples of the diol compound include polyethers such as polyethylene glycol and polypropylene glycol; polyesters such as poly(ethylene adipate) and poly(butylene adipate); and polycarbonates.

The urethane resin preferably contains a carboxyl group.

In embodiments of the invention, a fluorene resin can be also used as the pigment dispersant.

The weight ratio (the former/the latter) of the copolymer resin to the urethane resin is preferably in the range from 1:2 to 2:1 and more preferably in the range from 1:1.5 to 1.5:1 in view of balancing the gloss of a color image, prevention of bronzing, and the preservation stability of the ink composition and forming a color image with enhanced gloss.

In view of balancing the gloss of a color image, prevention of bronzing, and the preservation stability of the ink composition and forming a color image with enhanced gloss, the weight ratio (the former/the latter) of the solid content of the pigment to the solid content of components other than the pigment is preferably in the range from 100:20 to 100:80.

In view of balancing the gloss of a color image, prevention of bronzing, and the preservation stability of the ink composition and forming a color image with enhanced gloss, the copolymer resin is contained in an amount that is preferably in the range from 10 to 50 parts by weight with respect to 100 parts by weight of the pigment, more preferably in the range from 10 to 35 parts by weight.

In view of balancing the gloss of a color image, prevention of bronzing, and the preservation stability of the ink composition and forming a color image with enhanced gloss, the urethane resin is contained in an amount that is preferably in the range from 10 to 40 parts by weight with respect to 100 parts by weight of the pigment, more preferably in the range from 10 to 35 parts by weight.

In view of balancing the gloss of a color image, prevention of bronzing, and the preservation stability of the ink composition and forming a color image with enhanced gloss, the fluorene resin is contained in an amount that is preferably in the range from 20 to 200 parts by weight with respect to 100 parts by weight of the pigment, more preferably in the range from 10 to 80 parts by weight.

In view of balancing the gloss of a color image, prevention of bronzing, and the preservation stability of the ink composition and forming a color image with enhanced gloss, the copolymer resin and the urethane resin are contained in the total amount of preferably 90 parts by weight or smaller (more preferably 70 parts by weight or smaller) with respect to 100 parts by weight of the pigment.

In view of balancing the gloss of a color image, prevention of bronzing, and the preservation stability of the ink composition and forming a color image with enhanced gloss, the copolymer resin preferably has an acid value from 50 to 320, more preferably from 100 to 250.

In view of balancing the gloss of a color image, prevention of bronzing, and the preservation stability of the ink composition and forming a color image with enhanced gloss, the urethane resin preferably has an acid value from 10 to 300, more preferably from 20 to 100. The term "acid value" as used herein is defined as the amount (mg) of potassium hydroxide needed to neutralize 1 g of resin.

In view of balancing the gloss of a color image, prevention of bronzing, and the preservation stability of the ink composition and forming a color image with enhanced gloss, the copolymer resin preferably has a weight-average molecular weight (Mw) from 2,000 to 30,000, more preferably from 2,000 to 20,000.

In view of balancing the gloss of a color image, prevention of bronzing, and the preservation stability of the ink composition and forming a color image with enhanced gloss, the uncrosslinked urethane resin preferably has a weight-average molecular weight (Mw) from 100 to 200,000, more preferably from 1,000 to 50,000. The Mw is measured by, for example, gel permeation chromatography (GPC).

In view of balancing the gloss of a color image, prevention of bronzing, and the preservation stability of the ink composition and forming a color image with enhanced gloss, the copolymer resin has a glass transition temperature (Tg) of preferably 30° C. or higher, more preferably in the range from 50° C. to 130° C., the Tg being measured in accordance with JIS K 6900.

In view of balancing the gloss of a color image, prevention of bronzing, and the preservation stability of the ink composition and forming a color image with enhanced gloss, the urethane resin has a glass transition temperature (Tg) that is preferably in the range from −50° C. to 200° C., more preferably in the range from −50° C. to 100° C., the Tg being measured in accordance with JIS K 6900.

In the pigment dispersion, the copolymer resin is adsorbed on the pigment or is free from the pigment. In view of balancing the gloss of a color image, prevention of bronzing, and the preservation stability of the ink composition and forming a color image with enhanced gloss, the copolymer resin has a maximum particle size of preferably 0.3 μm or smaller and has an average particle size of preferably 0.2 μm or smaller (more preferably 0.1 μm or smaller). The term "average particle size" as used herein is defined as the mean diameter (cumulative 50% diameter) of diameters of actually formed dispersion particles of pigment in a dispersion. Such average particle size can be measured with, for example, Microtrac UPA (commercially available from Microtrac Inc.).

The fluorene resin is not specifically limited as long as resin has a fluorene skeleton and can be produced, for example, as a result of copolymerizing the following monomer units:
5-isocyanato-1-(isocyanatomethyl)-1,3,3-trimethylcyclohexane (CAS No. 4098-71-9);
2,2'-[9H-fluoren-9-ylidenebis(4,1-phenyleneoxy)]bisethanol (CAS No. 117344-32-8);
3-hydroxy-2-(hydroxymethyl)-2-methylpropionic acid (CAS No. 4767-03-7); and
N,N-diethylethanamine (CAS No. 121-44-8).

A surfactant may be employed as the dispersant. Examples of the surfactant include anionic surfactants such as fatty acid salts, higher alkyl dicarboxylates, higher alcohol sulfates, higher alkyl sulfonates, condensates of higher fatty acids and amino acids, sulfosuccinates, naphthenates, liquid fatty oil sulfates, and alkylallyl sulfonates; cationic surfactants such as fatty acid amine salts, quaternary ammonium salts, sulfonium salts, and phosphonium salts; and nonionic surfactants such as polyoxyethylene alkyl ethers, polyoxyethylene alkyl esters, sorbitan alkyl esters, and polyoxyethylene sorbitan alkyl esters. The above surfactant is added to the ink composition and then obviously fulfills a function specific to a surfactant.

The same water and other components as used for the clear ink composition can be also employed.

In embodiments of the invention, examples of a pigment to be preferably used for the yellow ink composition include C. I. Pigment Yellows 1, 2, 3, 12, 14, 16, 17, 73, 74, 75, 83, 93, 95, 97, 98, 109, 110, 114, 128, 129, 138, 139, 147, 150, 151, 154, 155, 180, and 185. These pigments are used alone or in combination of two or more. Among these, at least one pigment selected from the group consisting of C. I. Pigment Yellows 74, 110, 128, 129, and 147 is preferably used. In particular, use of a mixture of C. I. Pigment Yellows 74 and 129 can contribute to forming an image with a further excellent color phase.

Although the solid content concentration of the pigment of the yellow ink composition used for the ink set of embodiments of the invention is not specifically limited, the yellow ink composition is preferably contains the pigment at a solid content concentration of 6 weight % or larger in view of securing color development in a recorded image.

The same alcohol solvent, surfactant, dispersant, water, and other components as used for the black ink composition can be added to the yellow ink composition.

Examples of a pigment that is contained in the magenta ink composition used for the ink set of the embodiments of the invention include C. I. Pigment Reds 5, 7, 12, 48 (Ca), 48 (Mn), 57 (Ca), 57:1, 112, 122, 123, 168, 184, 202, and 209; and C. I. Pigment Violet 19. These pigments are used alone or in combination of two or more. Among these, at least one pigment selected from the group consisting of C. I. Pigment Reds 122, 202, and 209; and C. I. Pigment Violet 19 is preferably used. In particular, a solid solution of γ-type C. I. Pigment Violet 19 and C. I. Pigment Red 202 is used as the pigment, thereby being able to form an image with a further excellent color phase.

The term "a solid solution of γ-type C.I. Pigment Violet 19 and C.I. Pigment Red 202" as used herein refers to a crystal in which the γ-type C.I. Pigment Violet 19 and the C.I. Pigment Red 202 are solved with each other to form a solid phase.

The amount ratio of the γ-type C.I. Pigment Violet 19 to the C.I. Pigment Red 202 in the solid solution can be appropriately controlled without departing from the scope of the invention, and the weight of the γ-type C.I. Pigment Violet 19 is preferably larger than that of the C.I. Pigment Red 202.

Although the solid content concentration of the pigment of the magenta ink composition used for the ink set of embodiments of the invention is not specifically limited, the magenta ink composition is preferably contains the pigment at a solid content concentration of 6 weight % or larger in view of securing color development in a recorded image.

The same alcohol solvent, surfactant, dispersant, water, and other components as used for the black ink composition can be added to the magenta ink composition.

Examples of a pigment that is contained in the cyan ink composition used for the ink set of embodiments of the invention include C. I. Pigment Blues 1, 2, 3, 15:3, 15:4, 15:34, 16, 22, and 60; and C. I. Vat Blues 4 and 60. These pigments are used alone or in combination of two or more. Among these, at least one of the C. I. Pigment Blue 15:3 and 15:4 is preferably used in particular. The C. I. Pigment Blue 15:3 is especially used, thereby being able to form an image with a further excellent color phase.

Although the solid content concentration of the pigment of the cyan ink composition used for the ink set of embodiments of the invention is not specifically limited, the cyan ink composition is preferably contains the pigment at a solid content concentration of 6 weight % or larger in view of securing color development in a recorded image.

The same alcohol solvent, surfactant, dispersant, water, and other components as used for the black ink composition can be added to the cyan ink composition.

Ink Jet Recording Method

In the ink jet recording method of embodiments of the invention, the clear ink composition, yellow ink composition, magenta ink composition, and cyan ink composition are at least used as ink compositions, droplets of the ink compositions are ejected to adhere to a recording medium, thereby being able to perform printing.

The ink droplets may adhere to a recording medium as follows: droplets of any of the black ink composition, the yellow ink composition, the magenta ink composition, and the cyan ink composition adhere to the recording medium, and then droplets of the clear ink composition adhere to the recording medium; and to the contrary, droplets of the clear ink composition adhere to the recording medium, and then droplets of any of the black ink composition, the yellow ink composition, the magenta ink composition, and the cyan ink composition adhere to the recording medium. Furthermore, droplets of any of the black ink composition, the yellow ink composition, the magenta ink composition, and the cyan ink composition may adhere to a recording medium substantially in conjunction with the adherence of droplets of the clear ink composition.

In the above adhering manner, it is preferable that droplets of any of the black ink composition, the yellow ink composition, the magenta ink composition, and the cyan ink composition adhere to the recording medium and that droplets of the clear ink composition then adhere to the recording medium, and it is preferable that droplets of any of the black ink composition, the yellow ink composition, the magenta ink composition, and the cyan ink composition adhere to the recording medium substantially in conjunction with the adherence of droplets of the clear ink composition. It is more preferable that droplets of any of the black ink composition, the yellow ink composition, the magenta ink composition, and the cyan ink composition adhere to the recording medium and that droplets of the clear ink composition then adhere to the recording medium. The term "substantially in conjunction" as used herein means that ink compositions are ejected from different nozzle lines of a certain head of a printer to perform printing within single driving.

In the printing method of embodiments of the invention, synthetic paper or actual printing paper is preferably used as a recording medium. In particular, even in the case where printing is performed at low resolution on art paper, high image-quality paper used in POD, or laser printer paper, a high-quality image free from white streaks and roughness can be formed. Examples of the high image-quality paper used in POD include Ricoh business coat gloss 100 (commercially available from Ricoh Company, Ltd.). Examples of the laser printer paper include LPCCTA4 (commercially available from by Seiko Epson Co.).

EXAMPLE

Although embodiments of the invention will be hereinafter described in more detail with reference to examples, embodiments of the invention are not limited to the examples.

Clear Ink Composition

Components were mixed in accordance with composition listed in Table 1, and the resultant products were filtrated through a membrane filter having a pore size of 10 μm, thereby preparing ink compositions. The values in Table 1 represent the contents (weight %) of the components in the ink compositions. In Table 1, a fluorene resin contained a monomer having a fluorene skeleton represented by CAS No. 117344-32-8 in a monomer proportion of approximately 50 weight % and had a molecular weight of 3,300; a styrene-acrylic acid resin was a copolymer having a molecular weight of 1,600 and an acid value of 150; AQUACER 515 (polyethylene-based wax, particle diameter that is in the range from 100 to 200 nm, a melting point of 130° C., 30% solid content, and commercially available from BYK Japan KK) was used; a sulfonate resin was prepared as in the manner that will be hereinafter described; CHEMIPEARL W4005 (polyethylene-based wax, particle diameter from 200 to 800 nm, Ring and Ball softening point of 110° C., hardness of three in accordance with needle penetrometer method, 40% solid content, and commercially available from Mitsui Chemicals, Inc.) was used; and Olfine E1010 (commercially available from Nissin Chemical Industry Co., Ltd.) was used.

In Table 1, the surfactant X was an polyorganosiloxane surfactant that was produced by using a compound represented by the formula (I) in which R was a hydrogen atom, a was an integer from 7 to 11, m was an integer from 30 to 50, and n was an integer from 3 to 5.

The surfactant Y was an polyorganosiloxane surfactant that was produced by using a compound represented by the formula (I) in which R was a methyl group, a was an integer from 9 to 13, m was an integer from 2 to 4, and n was an integer from 1 to 2.

The surfactant Z was an polyorganosiloxane surfactant that was produced by using a compound represented by the formula (I) in which R was a methyl group, a was an integer from 6 to 18, m was 0, and n was 1.

Preparation of Sulfonate Resin

Each of the following components was fed into a 2 L beaker and was then stirred for 10 minutes at a rate of 100 rpm, thereby producing a monomer emulsion.

Ethylenically unsaturated monomer: methyl methacrylate 348 g (58 parts by weight);
  butyl acrylate 240 g (40 parts by weight); and
  acrylic acid 12 g (2 parts by weight)

Reactive emulsifier: aqueous solution of 15% Aqualon KH-10 (commercially available from DAI-ICHI KOGYO SEIYAKU CO., LTD., containing a sulfate ester group and a polyoxyethylene group) 30 g Chain transfer agent: 2-ethylhexyl thioglycolate 6 g Water: 450 g Next, water of 520 g and an aqueous solution of the above reactive emulsifier 15% of 90 g were supplied into a 2 L separable flask and were then heated to a temperature of 60° C. while being stirred at a rate of 180 rpm. Ammonium persulfate of 2 g was then added to the resultant product, and the resultant product was then heated to a temperature of 70° C.

The above monomer emulsion was successively added to the aqueous solution of the reactive emulsifier in this state for emulsion polymerization, while three hours were spent and a polymerization temperature was held at 75° C. The polymerization solution was subsequently heated to a temperature of 80° C., and the resultant product was then allowed to stand for an hour and was then cooled. Next, a 10% aqueous ammonia solution was added to the polymerization solution for neutralization, and the resultant product was adjusted so as to have a pH level of 7.3.

The average particle diameter, film formation temperature, and weight-average molecular weight (Mw) of the produced sulfonate resin were measured, and the sulfonate resin had an average particle diameter of 50 nm, a film formation temperature of 15° C., and a Mw of 45,000. In this case, the average particle diameter was measured with photal PAR-III (commercially available from Otsuka Electronics Co., Ltd.), the film formation temperature was measured with a film formation temperature tester (commercially available from Rigaku Corporation). The weight-average molecular weight was measured with a GPC system [SC 8010 (GPC) commercially available from TOSOH CORPORATION] using a standard curve of polystyrene standard. The following measurement conditions are employed.

Eluent: tetrahydrofuran

Column: G4000XL (commercially available from TOSOH CORPORATION)

Flow rate: 1000 μL per minute

Column temperature: 40° C.

TABLE 1

|  |  | Examples |  |  |  |  |  |  |  |
|---|---|---|---|---|---|---|---|---|---|
|  |  | 1 | 2 | 3 | 4 | 5 | 6 | 7 | 8 |
| Colorant | C.I. Pigment Black 6 | 0 | 0 | 0 | 0 | 0 | 0 | 0 | 0 |
| Resin | Fluorene resin | 6 | 6 | 6 | 6 | 6 | 6 | 2 | 10 |
|  | Styrene-acrylic acid resin | 0 | 0 | 0 | 0 | 0 | 0 | 0 | 0 |
|  | AQUACER 515 | 0 | 0 | 0 | 0 | 0 | 0 | 0 | 0 |
|  | Sulfonate resin | 0 | 0 | 0 | 0 | 0 | 0 | 0 | 0 |
|  | CHEMIPEARL W4005 | 0.6 | 0.6 | 0.6 | 0.6 | 0.6 | 0.6 | 0.6 | 0.6 |
| Alcohol solvent | 1,2-octanediol | 1 | 2.5 | 4 | 1 | 2.5 | 4 | 2.5 | 2.5 |
|  | 1,2-hexanediol | 2 | 2 | 2 | 2 | 2 | 2 | 2 | 2 |
|  | Dipropylene glycol | 5 | 5 | 5 | 10 | 10 | 10 | 5 | 5 |
|  | 1,2,6-hexanetriol | 0 | 0 | 0 | 0 | 0 | 0 | 0 | 0 |
|  | Glycerin | 7 | 7 | 7 | 7 | 7 | 7 | 7 | 7 |

TABLE 1-continued

|  |  |  |  |  |  |  |  |  |
|---|---|---|---|---|---|---|---|---|
| Surfactant X | 0.1 | 0.1 | 0.1 | 0.1 | 0.1 | 0.1 | 0.1 | 0.1 |
| Y | 0.1 | 0.1 | 0.1 | 0.1 | 0.1 | 0.1 | 0.1 | 0.1 |
| Z | 0.1 | 0.1 | 0.1 | 0.1 | 0.1 | 0.1 | 0.1 | 0.1 |
| OLFINE E1010 | 0 | 0 | 0 | 0 | 0 | 0 | 0 | 0 |
| Pure water | Balance | Balance | Balance | Balance | Balance | Balance | Balance | Balance |
| Total | 100 | 100 | 100 | 100 | 100 | 100 | 100 | 100 |

|  |  | Examples | | Comparison examples | | | | | Reference example |
|---|---|---|---|---|---|---|---|---|---|
|  |  | 9 | 10 | 1 | 2 | 3 | 4 | 5 | 1 |
| Colorant | C.I. Pigment Black 6 | 0 | 0 | 0 | 0 | 0 | 0 | 0 | 6 |
| Resin | Fluorene resin | 6 | 6 | 0 | 6 | 1.2 | 0 | 0 | 1.2 |
|  | Styrene-acrylic acid resin | 0 | 0 | 0 | 0 | 1.2 | 0 | 0 | 1.2 |
|  | AQUACER 515 | 0 | 0 | 0 | 0 | 0 | 7 | 0.5 | 0 |
|  | Sulfonate resin | 0 | 0 | 0 | 0 | 0 | 1 | 0.5 | 0 |
|  | CHEMIPEARL W4005 | 0.2 | 1.2 | 0.6 | 0 | 0 | 0.6 | 0.2 | 0 |
| Alcohol solvent | 1,2-octanediol | 2.5 | 2.5 | 1 | 1 | 2 | 3 | 0 | 2 |
|  | 1,2-hexanediol | 2 | 2 | 1 | 1 | 1 | 5 | 5 | 1 |
|  | Dipropylene glycol | 5 | 5 | 3 | 3 | 0 | 0 | 0 | 0 |
|  | 1,2,6-hexanetriol | 0 | 0 | 0 | 0 | 6 | 0 | 0 | 6 |
|  | Glycerin | 7 | 7 | 7 | 7 | 0 | 7 | 30 | 5 |
| Surfactant | X | 0.1 | 0.1 | 0.1 | 0.1 | 0.1 | 0.1 | 0 | 0.1 |
|  | Y | 0.1 | 0.1 | 0.1 | 0.1 | 0.1 | 0.1 | 0 | 0.1 |
|  | Z | 0.1 | 0.1 | 0.1 | 0.1 | 0.1 | 0.1 | 0 | 0.1 |
| OLFINE E1010 |  | 0 | 0 | 0 | 0 | 0 | 0 | 0.5 | 0 |
| Pure water |  | Balance | Balance | Balance | Balance | Balance | Balance | Balance | Balance |
| Total |  | 100 | 100 | 100 | 100 | 100 | 100 | 100 | 100 |

Evaluation
Evaluation of Fixability

The two ink cartridges of an ink jet printer (PX-G900 commercially available from SEIKO EPSON CORPORATION) were filled with black ink compositions of a reference example 1 and were individually attached to the line on the far left side (position originally for a yellow ink cartridge in a commercially available product), facing in the paper ejection direction in the printer, and to the line adjacent to the right side thereof (position originally for a magenta ink cartridge in a commercially available product). Other two ink cartridges were filled with clear ink compositions (clear ink compositions of examples 1 to 10 and comparison examples 1 to 5) and were individually attached to the third line from left (position originally for a cyan ink cartridge in a commercially available product), facing in the paper ejection direction in the printer, and to the line adjacent to the right side thereof (position originally for a matte black ink cartridge in a commercially available product). The black ink was used in an adhesion amount of 3.0 mg/inch$^2$ to perform solid printing on OK Topkote Plus (commercially available from Oji Paper Co., Ltd.) as actual printing paper at a resolution of 720×720 dpi in a dot weight of 7 ng per a dot. Subsequently within a minute, the black solid print was over-coated with the clear ink, in an adhesion amount of 1.0 mg/inch$^2$, at a resolution of 720×720 dpi in a dot weight of 3 ng per a dot. The resultant product was then allowed to stand at normal temperature for five minutes for drying. A test with a load of 500 g was performed ten times using a Gakushin-type color fastness/rubbing tester (AB-301 commercially available from Tester Sangyo, Ltd.). The image on the record was captured using a scanner and was binarized using Adobe Photoshop to calculate an area in which the image was fixed. The following evaluation criteria were employed. In this case, in order to evaluate the ink composition of the reference example 1, the solid printing was performed in the above manner, the resultant product was then allowed to stand at normal temperature for drying, and an area in which the image was fixed was similarly calculated. The ink composition of the reference example 1 was evaluated in accordance with the following evaluation criteria.

S: a fixing area accounted for 95% or larger of a printed region;

A: a fixing area accounted for 80% or larger and less than 95% of a printed region;

B: a fixing area accounted for 50% or larger and less than 80% of a printed region;

C: a fixing area accounted for 30% or larger and less than 50% of a printed region; and D: a fixing area accounted for less than 30% of a printed region Evaluation results were obtained as listed in Table 2.
Evaluation of Improvement in Color Development The two ink cartridges of an ink jet printer (PX-G900 commercially available from SEIKO EPSON CORPORATION) were filled with black ink compositions of the reference example 1 and were individually attached to the line of the far left side (position originally for a yellow ink cartridge in a commercially available product), facing in the paper ejection direction in the printer, and to the line adjacent to the right side thereof (position originally for a magenta ink cartridge in a commercially available product). Other two ink cartridges were filled with clear ink compositions and were individually attached to the third line from left (position originally for a cyan ink cartridge in a commercially available product), facing in the paper ejection direction in the printer, and to the line adjacent to the right side thereof (position originally for a matte black ink cartridge in a commercially available product). The black ink of the reference example 1 was used in an adhesion amount of 3.0 mg/inch² to perform solid printing on OK Topkote Plus (commercially available from Oji Paper Co., Ltd.) as actual printing paper at a resolution of 720×720 dpi in a dot weight of 7 ng per a dot. Subsequently, the black solid print was over-coated with the clear ink, in an adhesion amount of 1.0 mg/inch², at a resolution of 720×720 dpi in a dot weight of 3 ng per a dot. The resultant product was then allowed to stand for 30 minutes at normal temperature for drying. The color development of the produced print was measured with SPM50 commercially available from GretagMacbeth Corporation. The measurement results were evaluated in accordance with the following criteria.

A: optical density (OD) after the over-coating with the clear ink increased in a value of 0.2 or more relative to that before the over-coating;

B: OD after the over-coating with the clear ink increased in a value of 0.1 or more and less than 0.2 relative to that before the over-coating; and C: OD after the over-coating with the clear ink increased in a value of less than 0.1 relative to that before the over-coating Evaluation results were obtained as listed in Table 2.

Evaluation of Printing Stability After Passage of Time

The prepared clear ink and black ink were allowed to stand for three days at a temperature of 70° C. and were then supplied to the ink cartridges of an ink jet printer (PX-G900 commercially available from SEIKO EPSON CORPORATION), and character patterns were continuously printed. In this case, presence or absence of defective dot formation and splashed ink were observed at the time that 10 hours had passed from start of the printing. The observation results were evaluated in accordance with the following criteria.

A: defective dot formation and splashed ink were observed at most five times, and the defective dot formation and splashed ink were overcome through cleaning;

B: defective dot formation and splashed ink were observed from 6 to 10 times, and the defective dot formation and splashed ink were overcome through cleaning; and C: defective dot formation and splashed ink were observed from 6 to 10 times, and the defective dot formation and splashed ink were not overcome through cleaning Evaluation results were obtained as listed in Table 2.

Evaluation of Generation of Clear Ink Aggregation Spots

The prepared clear ink was used in an adhesion amount of 3.0 mg/inch² to perform solid printing on OK Topkote Plus (commercially available from Oji Paper Co., Ltd.) as actual printing paper at a resolution of 720×720 dpi in a dot weight of 7 ng per a dot. The produced print was allowed to stand for 30 minutes at normal temperature for dying. Presence or absence of an aggregation spot was visually observed in the resultant record. The following observation criteria were employed.

A: an image had no aggregation spot or streak-like unevenness resulting from filling failure;

B: an image had no aggregation spot but had streak-like unevenness resulting from filling failure; and C: an image had an aggregation spot and streak-like unevenness resulting from filling failure Evaluation results were obtained as listed in Table 2.

Evaluation of Improvement in Gloss Resulting From Clear Ink

The prepared clear ink was used in an adhesion amount of 3.0 mg/inch² to perform solid printing on OK Topkote Plus (commercially available from Oji Paper Co., Ltd.) as actual printing paper at a resolution of 720×720 dpi in a dot weight of 7 ng per a dot. The produced print was allowed to stand for 30 minutes at normal temperature for dying. The gloss of the resultant record was measured with a glossmeter (commercially available from KONICA MINOLTA HOLDINGS, INC.). The following observation criteria were employed.

A: gloss was improved in a degree of 10 or more relative to that of a white background;

B: gloss was improved in a degree of 5 or more and less than 10 relative to that of a white background; and C: gloss was improved in a degree of less than 5 relative to that of a white background Evaluation results were obtained as listed in Table 2.

Evaluation of Recoverability From Clogging

The above ink cartridges and ink jet printer were used to evaluate the ink compositions for recoverability from clogging. After an ink change button had been pushed, the ink jet printer was unplugged. In such a state in which a head cap had been removed, the ink jet printer was allowed to stand at a temperature of 40° C. at 15% relative humidity for two days. The nozzles of the ink jet printer were then repeatedly cleaned until all the nozzles exhibited initial ejection performance. Recoverability from clogging was evaluated in accordance with the following criteria.

A: recovered from clogging by repeating the cleaning three times; and

B: not recovered from clogging by repeating the cleaning three times

TABLE 2

| | Fixability | Improvement in color development | Printing stability after passage of time | Clear ink aggregation spot | Improvement in gloss resulting from clear ink | Recoverability from clogging |
|---|---|---|---|---|---|---|
| Example 1 | S | A | A | B | A | A |
| Example 2 | S | A | A | A | A | A |
| Example 3 | S | A | A | A | A | A |
| Example 4 | A | A | A | B | A | A |
| Example 5 | A | A | A | A | A | A |
| Example 6 | A | A | A | A | A | A |
| Example 7 | A | A | A | A | B | A |
| Example 8 | S | A | A | A | A | B |
| Example 9 | B | A | A | A | A | A |
| Example 10 | S | B | A | A | B | A |
| Comparison example 1 | C | C | A | B | C | A |
| Comparison example 2 | C | A | A | B | A | A |
| Comparison example 3 | D | B | A | A | B | A |
| Comparison example 4 | S | B | C | A | B | A |

TABLE 2-continued

| | Fixability | Improvement in color development | Printing stability after passage of time | Clear ink aggregation spot | Improvement in gloss resulting from clear ink | Recoverability from clogging |
|---|---|---|---|---|---|---|
| Comparison example 5 | C | C | A | C | B | A |
| Reference example 1 | D | | A | | | A |

Ink Fixability After Printing

The two ink cartridges of an ink jet printer (PX-G900 commercially available from SEIKO EPSON CORPORATION) were filled with black ink compositions of the reference example 1 and were individually attached to the line on the far left side (position originally for a yellow ink cartridge in a commercially available product), facing in the paper ejection direction in the printer, and to the line adjacent to the right side thereof (position originally for a magenta ink cartridge in a commercially available product). Other two ink cartridges were filled with clear ink compositions of the example 2 and were individually attached to the third line from left (position originally for a cyan ink cartridge in a commercially available product), facing in the paper ejection direction in the printer, and to the line adjacent to the right side thereof (position originally for a matte black ink cartridge in a commercially available product).

Successive Printing

The black ink was used in an adhesion amount of 3.0 mg/inch$^2$ to perform solid printing on OK Topkote Plus (commercially available from Oji Paper Co., Ltd.) as actual printing paper at a resolution of 720×720 dpi in a dot weight of 7 ng per a dot. Subsequently within a minute, the black solid print was over-coated with the clear ink, in an adhesion amount of 1.0 mg/inch$^2$, at a resolution of 720×720 dpi in a dot weight of 3 ng per a dot. The resultant product was then allowed to stand at normal temperature for drying. In such a state, a test with a load of 500 g was intermittently performed ten times using a Gakushin-type color fastness/rubbing tester (AB-301 commercially available from Tester Sangyo, Ltd.). The image on the record was captured using a scanner and was binarized using Adobe Photoshop to calculate an area in which the image was fixed. The following evaluation criteria were employed.

Simultaneous Printing

The black ink composition of the reference example 1 and the clear ink composition of the example 2 were used to simultaneously perform printing on OK Topkote Plus (commercially available from Oji Paper Co., Ltd.) as actual printing paper at a resolution of 720×720 dpi in a dot weight of 7 ng per a dot. In this case, a recording image file was formed such that the black ink adhered in an amount of 3.0 mg/inch$^2$ and such that the clear ink adhered in an amount of 1.0 mg/inch$^2$, and printing was simultaneously performed in conjunction with driving of a head. The resultant product was allowed to stand at normal temperature for drying, and a test with a load of 500 g was intermittently performed ten times using a Gakushin-type color fastness/rubbing tester (AB-301 commercially available from Tester Sangyo, Ltd.) in such a state. The image on the record was captured using a scanner and was binarized using Adobe Photoshop to calculate an area in which the image is fixed. The following evaluation criteria were employed.

Evaluation Criteria

S: a fixing area accounted for 95% or larger of a printed region;
A: a fixing area accounted for 80% or larger and less than 95% of a printed region;
B: a fixing area accounted for 50% or larger and less than 80% of a printed region;
C: a fixing area accounted for 30% or larger and less than 50% of a printed region; and
D: a fixing area accounted for less than 30% of a printed region The evaluation results were listed in Tables 3 and 4. In Table 3, the term "use of clear ink" refers to a case in which the clear ink was applied within one minute after application of the black ink. In Table 4, the term "use of clear ink" refers to a case in which the clear ink was applied in conjunction with application of the black ink. In Tables 3 and 4, the term "nonuse of clear ink" refers to a case in which only the black ink was applied.

TABLE 3

| Time elapsed after printing (minute) | Nonuse of clear ink Fixing area | Use of clear ink Fixing area |
|---|---|---|
| 5 | D | S |
| 10 | D | S |
| 20 | D | S |
| 30 | D | S |

TABLE 4

| Time elapsed after printing (minute) | Nonuse of clear ink Fixing area | Use of clear ink Fixing area |
|---|---|---|
| 10 | D | B |
| 20 | D | A |
| 30 | D | S |

What is claimed is:

1. A clear ink composition comprising:
   a water-insoluble alkanediol having at least seven carbon atoms;
   a water-soluble alcohol that functions as a dissolution aid for dissolving the water-insoluble alkanediol;
   water;
   a fine polymer particle at least containing polyolefin; and
   a fluorene resin, wherein
   a colorant is not used.

2. The clear ink composition according to claim 1, wherein the water-insoluble alkanediol is 1,2-octanediol.

3. The clear ink composition according to claim 1, wherein the water-soluble alcohol is at least one material selected from the group consisting of 1,2,6-hexanetriol, 3-methyl-1,5-pentanetriol, 3-methyl-1,3-butanediol, 3-methyl-1,5-pentanediol, dipropylene glycol, 1,2-hexanediol, and 4-methyl-1,2-pentanediol.

4. The clear ink composition according to claim 1, wherein the fluorene resin contains a monomer having a fluorene skeleton represented by CAS No. 117344-32-8 in a monomer proportion of approximately 50 weight %.

5. The clear ink composition according to claim 1, wherein the polyolefin is polyolefin wax.

6. The clear ink composition according to claim 1, wherein the water-insoluble alkanediol is contained in an amount that is in the range from 2.0 to 4.0 weight % with respect to the total weight of the ink composition.

7. The clear ink composition according to claim 1, wherein the water-soluble alcohol is contained in an amount that is in the range from 7.0 to 12.0 weight % with respect to the total weight of the ink composition.

8. The clear ink composition according to claim 1, wherein the content ratio of the water-insoluble alkanediol to the water-soluble alcohol is in the range from 1:1 to 1:20.

9. The clear ink composition according to claim 1, wherein the fluorene resin is contained in an amount that is in the range from 2.0 to 10.0 weight % with respect to the total weight of the ink composition.

10. The clear ink composition according to claim 1, wherein the fine polymer particle is contained in an amount that is in the range from 0.2 to 1.2 weight % with respect to the total weight of the ink composition.

11. The clear ink composition according to claim 1, wherein the content ratio of the fluorene resin to the fine polymer particle is in the range from 3:1 to 30:1.

12. The clear ink composition according to claim 1, further comprising a surfactant.

13. The clear ink composition according to claim 12, wherein the surfactant is contained in an amount that is in the range from 0.01 to 1.0 weight % with respect to the total weight of the ink composition.

14. The clear ink composition according to claim 12, wherein the surfactant is as least one of an polyorganosiloxane surfactant and a gemini surfactant.

15. The clear ink composition according to claim 14, wherein the polyorganosiloxane surfactant contains at least one compound represented by the following formula:

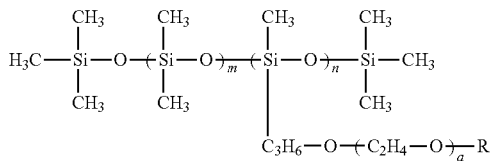

wherein R represents any one of a hydrogen atom and a methyl group, a represents an integer from 2 to 13, m represents an integer from 2 to 70, and n represents an integer from 1 to 8.

16. The clear ink composition according to claim 14, wherein the polyorganosiloxane surfactant contains at least one compound represented by the following formula:

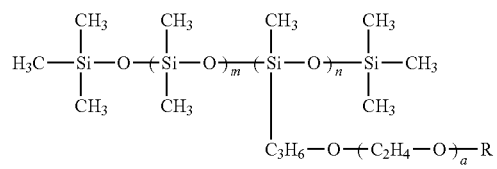

wherein R represents a methyl group, a represents an integer from 6 to 18, m is 0 to 4, and n is any of 1 and 2.

17. An ink set comprising:

a black ink composition;

a yellow ink composition;

a magenta ink composition;

a cyan ink composition; and the clear ink composition according to claim 1.

18. An ink jet recording method comprising;

ejecting a droplet of an ink composition; and bringing the droplet into adhering to a recording medium for printing, wherein the set according to claim 17 is used as the ink composition.

19. The ink jet recording method according to claim 18, wherein a droplet of any of the black ink composition, yellow ink composition, magenta ink composition, and cyan ink composition is brought into adhering to the recording medium, and a droplet of the clear ink composition is then brought into adhering to the recording medium.

20. The ink jet recording method according to claim 18, wherein the droplet of any of the black ink composition, yellow ink composition, magenta ink composition, and cyan ink composition is brought into adhering to the recording medium substantially in conjunction with the adherence of the droplet of the clear ink composition.

* * * * *